United States Patent Office 3,094,560
Patented June 18, 1963

3,094,560
N-HALOCYCLOALKENIC DERIVATIVES OF ARYLAMINES
John P. Luvisi, Park Ridge, and James J. Louvar, Riverside, Ill., assignors to Universal Oil Products Company, Des Plaines, Ill., a corporation of Delaware
No Drawing. Filed Mar. 9, 1959, Ser. No. 797,890
12 Claims. (Cl. 260—566)

This invention relates to new compositions of matter which are useful as pestiologically active agents and to a method for the preparation thereof. More specifically, the invention relates to a method for the preparation of N-halocycloalkenic derivatives of arylamines.

An object of this invention is to prepare halocycloalkenic derivatives of arylamines.

A further object of this invention is to prepare new compositions of matter comprising N-substituted halocycloalkenic derivatives of arylamines, said new compositions of matter being useful a pestiologically active compounds.

One embodiment of this invention is found in a process for the formation of an N-halocycloalkenic derivative of an arylamine which comprises condensing a halo substituted conjugated unsaturated compound selected from the group consisting of haloalkadienes and halocycloalkadienes with a ketone containing an olefinic linkage, and reacting the resultant condensation product with an arylamine to form the desired product.

A further embodiment of this invention is found in a process for the formation of an N-halocycloalkenic derivative of an arylamine which comprises condensing a halo substituted conjugated unsaturated compound selected from the group consisting of haloalkadienes and halocycloalkadienes with a ketone containing an olefinic linkage at a temperature in the range of from about 25° to about 150° C., and reacting the resultant condensation product with an arylamine in the presence of an inert organic diluent and a catalyst containing a metal of the platinum group of group VIII of the periodic table at a temperature in the range of from about 75° to about 150° C. to form the desired product.

Yet another embodiment of the invention resides in an N-halocycloalkenic derivative of an arylamine.

A specific embodiment of the invention is found in a process for the formation of N,N'-bis-[1-(1,4,5,6,7,7-hexachloro - 5-norbornen-2-yl)ethylidene]-p-phenylenediamine which comprises condensing hexachlorocyclopentadiene with methyl vinyl ketone at a temperature in the range of from about 25° to about 150° C., and reacting the resultant 1,4,5,6,7,7 - hexachloro-5-norbornen-2-yl methyl ketone with p-phenylenediamine at a temperature in the range of from about 75° to about 100° C. in the presence of benzene and a catalyst containing platinum to form said N,N'-bis-[1,4,5,6,7,7-hexachloro-5-norbornen-2-yl)ethylidene]-p-phenylenediamine.

Yet another specific embodiment of the invention resides in an N,N'-bis-[1-(1,4,5,6,7,7-hexachloro-5-norbornen-2-yl)ethylidene]-p-phenylenediamine.

Other objects and embodiments referring to alternative haloalkadienes, halocycloalkadienes and arylamines will be found in the following further detailed description of the invention.

It has now been discovered that N-halocycloalkenic derivatives of arylamines may be prepared by condensing a halo substituted alkadiene or cycloalkadiene with a ketone containing an olefinic linkage and reacting the resultant condensation product with an arylamine to thus prepare the desired product. For purposes of this invention the term "halocycloalkenic" when used in the specification and appended claims will refer to halocycloalkenic, polyhaloalkenic, halobicycloalkenic, and polyhalobicycloalkenic derivatives of the arylamine. The desired products of this invention will find a wide variety of uses in the chemical field, foremost of which will be their use as pestiologically active agents and specifically as insecticides or fungicides. For example, the reaction product which results from the condensation between hexachlorocyclopentadiene and methyl vinyl ketone followed by reacting the resultant condensation product with p-phenylenediamine, namely, N,N'-bis-[1-(1,4,5,6,7,7-hexachloro-5-norbornen-2-yl)ethylidene]-p-phenylenediamine may be used as an insecticide, especially against house-flies. In addition the reaction products of this invention may also be used as oxidation inhibitors or as intermediates in the preparation of resins, pharmaceuticals, plastics, etc.

The process of this invention in which the haloalkadiene or halocycloalkadiene of the type hereinafter described is condensed with a ketone containing an olefinic linkage will take place at a temperature in the range of from about room temperature, that is, 25° C., to about 150° C. or more, the temperature at which the reaction proceeds depending upon the reactants which are used therein. In addition, if so desired, higher temperatures may be employed along with superatmospheric pressures ranging from about 2 atmospheres to about 100 atmospheres or more, the particular pressure used being sufficient to maintain at least a portion of the starting materials in the liquid phase. In addition, the reaction is effected in the presence of water and a small amount of a polymerization inhibiting compound such as t-butyl-catechol, for example. These reactants, namely, the haloalkadiene or halocycloalkadiene and the ketone containing an olefinic linkage are usually reacted in the 1:1 molecular ratio.

The resultant condensation product which comprises a halocycloalkenyl alkyl ketone is further reacted with an arylamine at an elevated temperature, usually in the range of from about 75° to about 150° C. or more and at pressures ranging from atmospheric to about 100 atmospheres or more, said pressure being sufficient to maintain a major portion of the reactants in the liquid phase. In addition the second step of the process of this invention may, if so desired, be effected in the presence of an inert organic solvent or diluent, said solvents including saturated paraffins such as pentane, hexane, heptane, etc.; aromatic hydrocarbons such as benzene, toluene, o-xylene, m-xylene, p-xylene, ethyl benzene, etc.; alcohols such as methyl alcohol, ethyl alcohol, propyl alcohol, etc.; ethers such as dimethyl ether, diethyl ether, dipropyl ether, etc., or acetone, acetic acid, dioxane, etc. A catalyst is also present in the second step of the reaction for purposes of aiding in the removal of water which is formed during said reaction. This catalyst contains a metal of the platinum group of group VIII of the periodic table such as platinum, palladium, osmium, iridium, rhodium, ruthenium, either alone or composited on a solid support. A particularly suitable catalyst which may be used in this invention comprises platinum composited on a solid support such as alumina and containing combined halogen such as chlorine or fluorine. The halocycloalkenyl alkyl ketone and arylamine are reacted in a ratio of from 1 to 2 molecular proportions of the halocycloalkenyl alkyl ketone to 1 molecular proportion of arylamine, the molecular ratio being dependent upon the particular arylamine which is used in the reaction.

Halo substituted conjugated unsaturated compounds which may be reacted with the ketone containing an olefinic linkage in the process of the present invention include straight chain diolefins having the general formula:

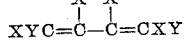

in which X is independently selected from the group consisting of hydrogen, alkyl, haloalkyl or halogen radicals having an atomic weight of from 35 to 127 (i.e. chlorine, bromine or iodine), at least one X being halogen or haloalkyl, and Y is independently selected from the group consisting of alkyl, haloalkyl, and hydrogen radicals; or polyhalocycloalkadienes having the general formula:

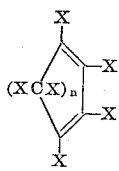

in which X has the same meaning as above and n is 1 or 2. Examples of these compounds include haloalkadienes such as 1- and 2-chloro-1,3-butadiene, 1,3-, 2,3- and 1,4-dichloro-1,3-butadiene, 1- and 2-bromo-1,3-butadiene, 1,3-, 2,3- and 1,4-dibromo-1,3-butadiene, 1,3-, 2,3- and 1,4-diiodo-1,3-butadiene, 1,2,3-trichloro-1,3-butadiene, 1,2,3-tribromo-1,3-butadiene, 1- and 2-iodo-1,3-butadiene, 1,2-diiodo-1,3-butadiene, 1,2,3 - triiodo - 1,3-butadiene, 1,2,4-trichloro-1,3-butadiene, 1,2,4-tribromo-1,3-butadiene, 1,2,4-triiodo-1,3-butadiene, 1,2,3,4-tetrachloro-1,3-butadiene, 1,2,3,4-tetrabromo-1,3-butadiene, 1,2,3,4-tetraiodo-1,3-butadiene, 1,3-dichloro-2-methyl-1,3-butadiene, 1,4-dichloro-2-methyl-1,3-butadiene, 1,3,4-trichloro-2-methyl-1,3-butadiene, 1,4 - dichloro - 2 - chloromethyl-1,3-butadiene, 1,4-dichloro-2-dichloromethyl-1,3-butadiene, 1,3-dibromo-2-methyl-1,3-butadiene, 1,4-dibromo-2-methyl-1,3-butadiene, 1,4-dibromo - 2 - bromomethyl-1,3-butadiene, 1,4-dibromo-2-dibromomethyl-1,3-butadiene, 1,3,4-tribromo-2-methyl-1,3-butadiene, 1,3-diiodo-2-methyl-1,3-butadiene, 1,4-diiodo - 2 - methyl - 1,3-butadiene, 1,4-diiodo-2-iodomethyl-1,3-butadiene, 1,4-diiodo-2-diiodomethyl-1,3-butadiene, 1,3,4-triiodo-2-methyl-1,3-butadiene, etc.; and halocycloalkadienes such as halogenated 1,3-cyclopentadienes which for purposes of this invention will be designated as halogenated cyclopentadienes including 1-chlorocyclopentadiene, 1,2-and other dichlorocyclopentadienes, 1,2,3- and other trichlorocyclopentadienes, 1,2,3,4- and other tetrachlorocyclopentadienes, 1,2,3,4,5- and other pentachlorocyclopentadienes, hexachlorocyclopentadiene, the corresponding bromo- and iodo- derivatives, etc. It is also contemplated within the scope of this invention that polyhalo substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc., may also be used. Furthermore, it is contemplated within the scope of this invention that fluorine analogs of the aforementioned unsaturated compounds such as hexafluorocyclopentadiene or 2,3-difluoro-1,3-butadiene may also be used, although not necessarily with equivalent results. Generally speaking the iodine, bromine and chlorine containing compounds are preferred because of their relatively greater availability and lower cost. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro-3-bromo-1,3-butadiene, 1-iodo-3-chloro-1,3-butadiene, 2-bromo-3-chloro-1,3-butadiene, 1,4-dichloro-2-bromomethyl-1,3-butadiene, 1,4-dichloro-2-iodomethyl-1,3-butadiene, 1-chloro - 2 - bromocyclopentadiene, 1,2-dichloro - 3 - bromocyclopentadiene, 1,2-dichloro-5,5-dibromocyclopentadiene, etc., although not necessarily with equivalent results.

Examples of ketones containing an olefinic linkage which may be condensed with the halo substituted conjugated unsaturated compound hereinbefore set forth include methyl vinyl ketone, ethyl vinyl ketone, n-propyl vinyl ketone, isopropyl vinyl ketone, n-butyl vinyl ketone, isobutyl vinyl ketone, t-butyl vinyl ketone, n-amyl vinyl ketone, isoamyl vinyl ketone, n-hexyl vinyl ketone, isohexyl vinyl ketone, etc., methyl allyl ketone, ethyl allyl ketone, propyl allyl ketone, isopropyl allyl ketone, n-butyl allyl ketone, isobutyl allyl ketone, t-butyl allyl ketone, n-amyl allyl ketone, isoamyl allyl ketone, n-hexyl allyl ketone, isohexyl allyl ketone, etc., methyl crotonyl ketone, ethyl crotonyl ketone, propyl crotonyl ketone, isopropyl crotonyl ketone, n-butyl crotonyl ketone, isobutyl crotonyl ketone, t-butyl crotonyl ketone, n-amyl crotonyl ketone, isoamyl crotonyl ketone, n-hexyl cotonyl ketone, isohexyl crotonyl ketone, etc.

Arylamines which may be condensed with the resultant halocycloalkenyl alkyl ketone include arylamines containing only nitrogen, carbon and hydrogen atoms such as aniline, o-toluidine, m-toluidine, p-toluidine, o-ethylaniline, m-ethylaniline, p-ethylaniline, o-propylaniline, m-propylaniline, p-propylaniline, o-phenylenediamine, m-phenylenediamine, p-phenylenediamine, 2-methyl-p-phenylenediamine, 2-ethyl-p-phenylenediamine, 2-propyl-p-phenylenediamine, etc. It is to be understood that the aforementioned halo substituted conjugated unsaturated compounds, ketones containing an olefinic linkage and arylamines are only representatives of the classes of compounds which may be used and that the present invention is not necessarily limited thereto.

An example of the condensation reactions of the present invention may be illustrated by the following equations in which the haloalkadiene to be used is 1,2,3,4-tetrachloro-1,3-butadiene and the ketone is methyl vinyl ketone, said reactants being used in a 1:1 molecular ratio:

I.

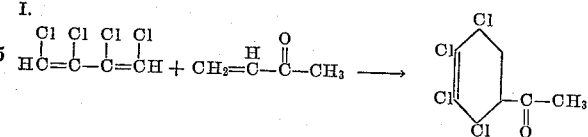

This intermediate ketone is then reacted with p-phenylenediamine in a mole ratio of 2 molecular proportions of ketone per molecular proportion of diamine according to the following equation:

II.

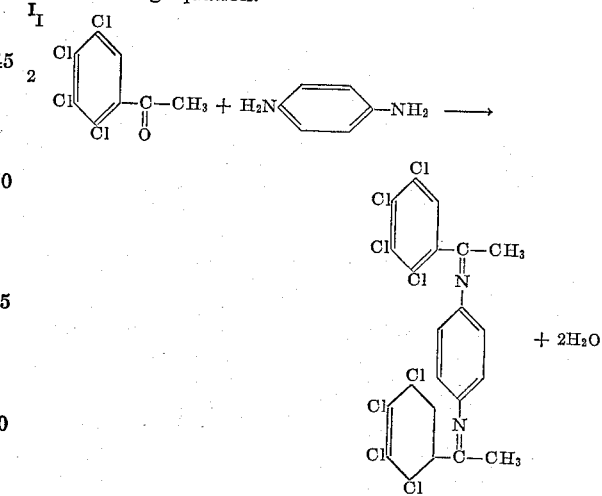

If a halocycloalkadiene such as hexachlorocyclopentadiene is condensed with methyl vinyl ketone the reaction is illustrated as follows:

III.

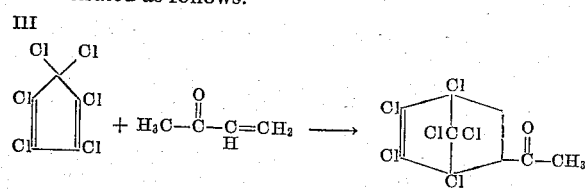

Two molecular proportions of the resultant 1,4,5,6,7,7-hexachloro-5-norbornen-2-yl methyl ketone may then be reacted with one molecular proportion of p-phenylenediamine to form the desired product N,N′-bis-[1-(1,4,5,6,7,7-hexachloro-5-norbornen - 2 - yl)ethylidene]-p-phenylenediamine according to the following equation:

IV

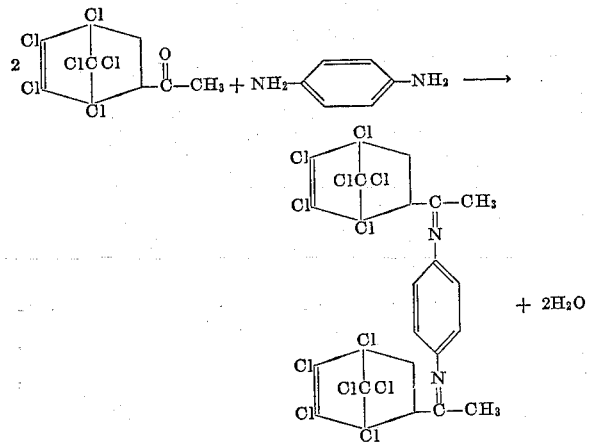

Accordingly, if the arylamine comprises aniline or a substituted aniline, one molecular proportion of the intermediate ketone product of the condensation reaction between the haloalkadiene or halocycloalkadiene and the ketone containing an olefinic linkage will be reacted with one molecular proportion of the aniline. An example of this is the reaction between 1,4,5,6,7,7-hexachloro-5-norbornen-2-yl methyl ketone and aniline to form N-[1-(1,4,5,6,7,7 - hexachloro-5-norbornen-2-yl)ethylidene]-aniline according to the equation:

V

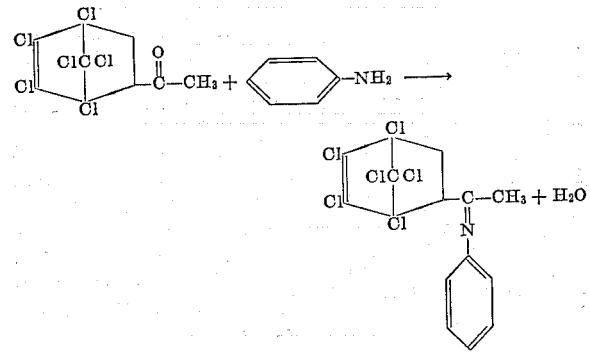

The physical properties of the present N-halocycloalkenic derivatives of arylamines and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain nose of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep pentration of the insecticide is desired, as in the treatment of fibrous material, such as wood, for extinction of a particular infestation, for example, wood termites. For other purposes, the required concentration of action components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, with as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of this invention may be effected in any suitable manner and may comprise either a batch or a continuous type operation. For example, when a batch type operation is used, a quantity of the starting materials comprising the haloalkadiene or halocycloalkadiene and the ketone containing an olefinic linkage along with the desired amount of water and the polymerization inhibiting compound are placed in a condensation apparatus provided with heating and mixing means. The apparatus, along with the contents thereof, is heated to the desired temperature for a predetermined period of time, at the end of which time the apparatus and contents thereof are allowed to cool to room temperature. The desired reaction product comprising the halocycloalkenyl alkyl ketone is separated from unreacted starting materials and/or by-products by conventional means such as fractional distillation, crystallization, etc. The aforementioned halocycloalkenyl alkyl ketone is then placed in a separate condensation apparatus along with the arylamine, the catalyst and, if so desired, the inert organic diluent. The apparatus is then heated to the desired temperature and maintained thereat for a predetermined period of time, the water which is formed by the reaction being continuously removed therefrom. At the end of the desired residence time the apparatus and contents thereof are cooled to room temperature and the desired product, comprising the N-halocycloalkenic derivative of the arylamine is separated from the unreacted starting materials and/or by-products by conventional means hereinbefore set forth.

Another method of effecting the condensation reactions of the present invention is by a continuous type operation. In this type of operation the starting materials comprising the halocycloalkadiene or haloalkadiene and the ketone containing an olefinic linkage are continuously charged to a reactor which is maintained at the proper operating conditions of temperature and pressure. The reactor may comprise an unpacked vessel or coil or may be lined with an adsorbent packing material such as fire brick, alumina, dehydrated bauxite or the like. The water and polymerization inhibitor are also continuously charged through separate lines or, if so desired, may be admixed with one or both of the starting materials prior to entry into said reactor and charged thereto in a single stream. The condensation product from the first step of the reaction, namely, the halocycloalkenyl alkyl ketone is continuously withdrawn from the reactor, separated from reactor effluent and continuously charged to a second reactor, the effluent being separated and recycled to form a portion of the starting materials. The second reactor is similar to the first reactor and is also maintained at the proper operating conditions of temperature and pressure. The arylamine is continuously charged to the second reactor through a separate line or, if so desired, may be admixed with the halocycloalkenyl alkyl ketone prior to entry into said reactor and charged thereto in a single stream. Additional means are also provided for the continual entry of the inert organic solvent if one is used in the reaction. The second reactor is provided with the catalyst, the use of a catalyst comprising a metal of the platinum group of group VIII of the periodic table either alone or composited on a solid support is particularly effective for a fixed bed type of continuous operation. In this type of operation the catalyst is positioned as a fixed bed in the reactor and the reactants pass over said catalyst in either an upward or downward flow. In addition, the second reactor is also provided with means for continuously withdrawing the water which is formed during the reaction. As in the case of the first reactor the desired reaction product, comprising an N-halocycloalkenic derivative of the arylamine is continuously withdrawn from the reactor and separated from the reactor effluent, the latter being recycled to form a portion of the starting materials, while the former is purified and recovered by conventional means hereinbefore set forth.

In addition to the fixed bed type of operation which may be used in the second step of this process, other types of continuous operation such as the compact moving bed type in which the bed of catalyst and the reactants pass either concurrently or countercurrently to each other and the slurry type operation in which the catalyst is carried into the reactor as a slurry in one of the reactants may also be used.

The following examples are given to illustrate the process of the present invention, which, however, are not intended to limit the generally broad scope of the present invention in strict accordance therewith.

*Example I*

A mixture of 285 g. (1 mole) of hexachlorocyclopentadiene and 60 g. (1 mole) of methyl vinyl ketone was slowly heated in a condensation flask along with 12 g. of water and 1 g. of t-butylcatechol for a period of about 10 hours at a temperature ranging from about 24° C. to about 140° C. At the end of this time the flask and contents thereof were cooled to room temperature and the desired ketone, namely, 1,4,5,6,7,7-hexachloro-5-norbornen-2-yl-methyl ketone in a 70% yield was recovered.

The aforementioned ketone was then reacted with p-phenylenediamine by heating 151.5 g. (0.4 mole) of the halocycloalkenyl alkyl ketone with 21.5 g. (0.2 mole) of the arylamine in 300 cc. of benzene and 10 g. of a platinum containing catalyst. The mixture was maintained at a temperature of about 85° C. for a period of approximately 23 hours, the water which was formed during the reaction (7 cc.) being continuously removed from the solution. At the end of this time the condensation flask and contents thereof were allowed to cool to room temperature and the desired reaction product comprising N,N'-bis-[1-(1,4,5,6,7,7-hexachloro-5 - norbornen - 2 - yl) ethylidene]-p-phenylenediamine was recovered, washed with water, dried and subjected to fractional crystallization. The desired product, which comprised 151 g. of a pearly off-white, crystalline material having a melting point of 271–272° C. was subjected to analysis with the following results:

Calcd. for: $C_{24}H_{16}Cl_{12}N_2$: C, 38.03; H, 2.12; N, 3.69; Cl, 56.14. Found: C, 38.73; H, 2.46; N, 3.97; Cl, 56.14.

*Example II*

In this experiment a mixture of 190 g. of (1.0 mole) of 1,2,3,4-tetrachloro-1,3-butadiene and 60 g. (1.0 mole) of methyl vinyl ketone along with approximately 10 g. of water and 1 g. of t-butylcatechol is slowly heated at a temperature ranging from about 24° C. to about 140° C. for a period of about 10 hours. At the end of this time the flask and contents thereof are allowed to cool to room temperature and the desired ketone, namely, 2,3,4,5-tetrachloro-3-cyclohexenyl methyl ketone is separated and recovered.

A mixture of 104 g. (0.4 mole) of the ketone and 21.5 g. (0.2 mole) of p-phenylenediamine along with 300 cc. of benzene and 10 g. of a platinum containing catalyst is heated at a temperature of about 85° C. for a period of about 23 hours. At the end of this time the flask and contents thereof are allowed to cool to room temperature and the desired product, comprising crystalline N,N'-bis-[1 - (2,3,4,5 - tetrachloro - 3 - cyclohexenyl)-ethylidene]-p-phenylenediamine is separated and recovered.

*Example III*

In this experiment a mixture of 285 g. (1.0 mole) of hexachlorocyclopentadiene and 84 g. (1.0 mole) of ethyl vinyl ketone is slowly heated at a temperature of from about 24° C. to about 140° C. for a period of about 10 hours, the condensation taking place in the presence of about 12 g. of water and 1 g. of a polymerization inhibitor comprising t-butylcatechol. At the end of this time the flask and contents thereof are allowed to cool to room temperature and the resulting ketone, comprising 1,4,5,6,7,7-hexachloro-5-norbornen-2-yl ethyl ketone is separated and recovered.

A mixture of this ketone (156.2 g.) and 21.5 g. of p-phenylenediamine is heated at a temperature of about 85° C. for approximately 23 hours in the presence of 300 cc. of benzene and 10 g. of a platinum containing catalyst. At the end of the aforementioned period of time the flask and contents thereof are cooled to room temperature and the desired product, comprising N,N'-bis-[1 - (1,4,5,6,7,7 - hexachloro - 5 - norbornen - 2 - yl)propylidene]-p-phenylenediamine is separated and recovered.

*Example IV*

In this experiment the starting materials comprise 285 g. (1.0 mole) of hexachlorocyclopentadiene and 60 g. (1.0 mole) of methyl vinyl ketone. The reactants are treated in a manner similar to that set forth in the above examples and the intermediate product, comprising 1,4,5,6,7,7-hexachloro-5-norbornen-2-yl methyl ketone is separated and recovered.

This ketone in an amount of 75.5 g. (0.2 mole) and 18.5 g. (0.2 mole) of aniline are heated to a temperature of about 85° C. in the presence of 300 cc. of toluene and 10 g. of a platinum containing catalyst. At the end of the residence time the flask and contents thereof are cooled to room temperature and the desired product, comprising N - [1 - (1,4,5,6,7,7 - hexachloro - 5 - norbornen-2-yl)-ethylidene]aniline is separated and recovered.

*Example V*

In this example 190 g. (1.0 mole) of 1,2,3,4-tetrachloro-1,3-butadiene and 84 g. (1.0 mole) of ethyl vinyl ketone are treated in a manner similar to that set forth in the above examples. The intermediate ketone comprising 2,3,4,5-tetrachloro-3-cyclohexenyl ethyl ketone is further condensed with aniline in equimolecular proportions in the presence of toluene and a platinum containing catalyst.

The desired product, comprising N-[1-(2,3,4,5-tetrachloro-3-cyclohexenyl)propylidene]aniline is separated and recovered.

*Example VI*

Equimolecular proportions of hexachlorocyclopentadiene and N-propyl vinyl ketone are condensed in the presence of water and a polymerization inhibitor in a manner similar to that set forth in the above examples. The intermediate ketone comprising 1,4,5,6,7,7-hexachloro-5-norbornen-2-yl propyl ketone is further condensed with p-phenylenediamine in a molecular ratio of 2 moles of ketone to 1 mole of the p-phenylenediamine under conditions similar to that set forth in the above examples. The desired reaction product, comprising N,N'-[1-(1,4,5,6,7,7 - hexachloro - 5 - norbornen - 2 - yl)butylidene]-p-phenylenediamine is separated and recovered.

*Example VII*

A mixture of equimolecular proportions of 1,2,3,4-tetrachloro-1,3,butadiene and methyl allyl ketone are condensed in a manner similar to that set forth in the above examples. The intermediate ketone is further condensed with aniline in a 1:1 molecular ratio under conditions also set forth in the above examples. The desired product, comprising N-[1-(2,3,4,5-tetrachloro-3-cyclohexenylmethyl)ethylidene]aniline is separated and recovered.

*Example VIII*

In this example equimolecular proportions of hexachlorocyclopentadiene and ethyl allyl ketone are condensed in a manner similar to that set forth in the above examples. The intermediate ketone is further condensed with p-phenylenediamine in a molecular ratio of 2 molecular proportions of the ketone to 1 molecular proportion of the p-phenylenediamine under conditions similar to that hereinbefore set forth. The resultant product, comprising N,N' - bis - [1 - (1,4,5,6,7,7 - hexachloro-5 - norbornen - 2 - yl methyl)propylidene] - p - phenylenediamine is separated and recovered.

*Example IX*

An insecticidal solution is prepared by dissolving 1 g. of N,N' - bis - [1 - (1,4,5,6,7,7 - hexachloro - 5 - norbornen-2-yl)ethylidene]-p-phenylenediamine in 2 cc. of benzene and adding 100 cc. of water using Triton X–100 as an emulsifying agent. This solution is sprayed into a cage containing common houseflies and causes a 100% knockdown. Similar tests using other compounds set forth in the above examples will show similar results.

We claim as our invention:

1. An N-halocycloalkenic derivative of an arylamine prepared by condensing a halo substituted conjugated unsaturated compound selected from the group consisting of halogenated butadienes, cyclopentadienes and cyclohexadienes with an alkenyl alkyl ketone having from 2 to 4 carbon atoms in the alkenyl group and from 1 to 7 carbon atoms in the alkyl group at a temperature in the range of from about 25° to about 150° C., and reacting the resultant halocycloalkenyl alkyl ketone with an arylamine containing up to 9 carbon atoms per molecule in the presence of a metal of the platinum group of group VIII of the periodic table at a temperature in the range of from about 75° to about 150° C.

2. An N-halocycloalkenic derivative of aniline prepared by condensing a halo substituted conjugated unsaturated compound selected from the group consisting of halogenated butadienes, cyclopentadienes and cyclohexadienes with a ketone having from 2 to 4 carbon atoms in the alkenyl group and from 1 to 7 carbon atoms in the alkyl group at an alkenyl alkyl temperature in the range of from about 25° to about 150° C., and reacting the resultant halocycloalkenyl alkyl ketone with aniline in the presence of a metal of the platinum group of group VIII of the periodic table at a temperature in the range of from 75° to about 150° C.

3. An N-halocycloalkenic derivative of an arylamine prepared by condensing hexachlorocyclopentadiene with an alkenyl alkyl ketone having from 2 to 4 carbon atoms in the alkenyl group and from 1 to 7 carbon atoms in the alkyl group at a temperature in the range of from about 25° to about 150° C., and reacting the resultant halocycloalkenyl alkyl ketone with an arylamine containing up to 9 carbon atoms per molecule in the presence of a metal of the platinum group of group VIII of the periodic table at a temperature in the range of from about 75° to about 150° C.

4. An N-halocycloalkenic derivative of an arylamine prepared by condensing 1,2,3.4-tetrachloro-1,3-butadiene with an alkenyl alkyl ketone having from 2 to 4 carbon atoms in the alkenyl group and from 1 to 7 carbon atoms in the alkyl group at a temperature in the range of from about 25° to about 150° C., and reacting the resultant halocycloalkenyl alkyl ketone with an arylamine containing up to 9 carbon atoms per molecule in the presence of a metal of the platinum group of group VIII of the periodic table at a temperature in the range of from about 75° to about 150° C.

5. An N-halocycloalkenic derivative of an arylamine prepared by condensing a halo substituted conjugated unsaturated compound selected from the group consisting of halogenated butadienes, cyclopentadienes and cyclohexadienes with methyl vinyl ketone at a temperature in the range of from about 25° to about 150° C., and reacting the resultant halocycloalkenyl alkyl ketone with an arylamine containing up to 9 carbon atoms per molecule in the presence of a metal of the platinum group of group VIII of the periodic table at a temperature in the range of from about 75° to about 150° C.

6. An N-halocycloalkenic derivative of an arylamine prepared by condensing a halo substituted conjugated unsaturated compound selected from the group consisting of halogenated butadienes, cyclopentadienes and cyclohexadienes with ethyl vinyl ketone at a temperature in the range from about 25° to about 150° C., and reacting the resultant halocycloalkenyl alkyl ketone with an arylamine containing up to 9 carbon atoms per molecule in the presence of a metal of the platinum group of group VIII of the periodic table at a temperature in the range of from about 75° to about 150° C.

7. An N-halocycloalkenic derivative of a p-phenylenediamine prepared by condensing a halo substituted conjugated unsaturated compound selected from the group consisting of halogenated butadienes, cyclopentadienes and cyclohexadienes with an alkenyl alkyl ketone having from 2 to 4 carbon atoms in the alkenyl group and from 1 to 7 carbon atoms in the alkyl group at a temperature in the range of from about 25° to about 150° C., and reacting the resultant halocycloalkenyl alkyl ketone with p-phenylenediamine in the presence of a metal of the platinum group of group VIII of the periodic table at a temperature in the range of from about 75° to about 150° C.

8. A process for the formation of N,N'-bis-[1-(1,4,5,6,7,7-hexachloro-5-norbornen-2-yl)ethylidene] - p-phenylenediamine prepared by condensing hexachlorocyclopentadiene with methyl vinyl ketone at a temperature in the range of from about 25° to about 150° C., and reacting the resultant 1,4,5,6,7,7-hexachloro-5-norbornen-2-yl-methyl ketone with p-phenylenediamine at a temperature in the range of from about 75° to about 100° C. in the presence of platinum.

9. A process for the formation of N,N'-bis-[1-(2,3,4,5-tetrachloro-3-cyclohexenyl)ethylidene] - p - phenylenediamine prepared by condensing 1,2,3,4-tetrachloro-1,3-butadiene with methyl vinyl ketone at a temperature in the range of from about 25° to about 150° C., and reacting the resultant 2,3,4,5-tetrachloro-3-cyclohexenyl methyl ketone with 6-phenylenediamine at a temperature in the range of from about 75° to about 100° C. in the presence of platinum.

10. A process for the formation of N,N'-bis-[1-(1,4,5,6,7,7-hexachloro-5-norbornen - 2 - yl)propylidene] - p-phenylenediamine prepared by condensing hexachlorocyclopentadiene with ethyl vinyl ketone at a temperature in the range of from about 25° to about 150° C., and reacting the resultant 1,4,5,6,7,7-hexachloro-5-norbornen-2-yl ethyl ketone with p-phenylenediamine at a temperature in the range of from about 75° to about 150° C. in the presence of platinum.

11. A process for the formation of N-[1-(1,4,5,6,7,7-hexachloro-5-norbornen-2-yl)ethylidene]aniline prepared by condensing hexachlorocyclopentadiene with methyl vinyl ketone at a temperature in the range of from about 25° to about 150° C., and reacting the resultant 1,4,5,6,7,7-hexachloro-5-norbornen-2-yl methyl ketone with aniline at a temperature in the range of from about 75° to about 100° C. in the presence of platinum.

12. A process for the formation of N-[1-(2,3,4,5-tetrachloro-3-cyclohexenyl)propylidene]aniline prepared by condensing 1,2,3,4-tetrachloro-1,3-butadiene with ethyl vinyl ketone at a temperature in the range of from about 25° to about 150° C., and reacting the resultant 2,3,4,5-tetrachloro-3-cyclohexenyl ethyl ketone with aniline at a temperature in the range of from 75° to about 100° C. in the presence of platinum.

References Cited in the file of this patent

UNITED STATES PATENTS

| | | |
|---|---|---|
| 2,198,260 | Van Melsen | Apr. 23, 1940 |
| 2,616,928 | Gilbert et al. | Nov. 4, 1952 |
| 2,744,137 | Grewe | May 1, 1956 |
| 2,773,799 | Fan | Dec. 11, 1956 |
| 2,798,094 | Shepard et al. | July 2, 1957 |

FOREIGN PATENTS

| | | |
|---|---|---|
| 786,215 | Great Britain | Nov. 13, 1957 |

OTHER REFERENCES

Prill: Jour. Amer. Chem. Soc,. vol. 69 (January 1947), pages 62–63 (2 pages).